United States Patent [19]
Korten

[11] 3,889,805
[45] June 17, 1975

[54] FISHING TACKLE RACK
[76] Inventor: Chauncey F. Korten, 2410 Vinewood, Ann Arbor, Mich. 48104
[22] Filed: Apr. 30, 1973
[21] Appl. No.: 355,545

[52] U.S. Cl. ............. 206/223; 16/150; 43/54.5 R; 43/57.5 R; 206/315; 206/373; 220/4 B; 220/20; 220/94 R; 220/323; 220/334; 220/335
[51] Int. Cl. ............. B65d 85/00; A01k 97/00
[58] Field of Search .............. 206/315, 223, 373; 220/4 E, 9 F, 4 B, 20–22, 31 R, 31 S, 334, 323, 335; 217/26, 26.5, 27, 53; 43/26, 54.5 R, 57.5 R, 55; 16/128 R, 150; 270/38.5, 94 R

[56] References Cited
UNITED STATES PATENTS

| | | | |
|---|---|---|---|
| 747,175 | 12/1903 | Hill | 16/150 |
| 1,240,520 | 9/1917 | Webb | 217/19 |
| 2,724,208 | 11/1955 | Nelson | 206/315 |
| 2,903,814 | 9/1959 | Greer | 43/55 |
| 3,040,923 | 6/1962 | Leitzel | 229/2.5 |
| 3,155,264 | 11/1964 | Shook | 220/4 E |
| 3,181,693 | 5/1965 | Freistat | 206/523 |
| 3,200,943 | 8/1965 | Waterbury | 217/27 |
| 3,310,905 | 3/1967 | Davis et al. | 43/57.5 R |
| 3,465,467 | 9/1969 | Allen | 220/38.5 |

Primary Examiner—William I. Price
Assistant Examiner—Stephen Marcus
Attorney, Agent, or Firm—Olsen and Stephenson

[57] ABSTRACT

A fishing tackle container formed from two panel-shaped blocks of rigid foam plastic. The blocks have been shaped to provide first and second body sections with a plurality of cavities of appropriate configuration therein for holding fish tackle, the body sections being hingedly connected together by stretch cords for movement between open and closed positions. In the closed position it serves as a storage and carrying case utilizing stretch cords to secure it in the closed position and to serve as a carrying handle. In the open position it serves as an operational terminal tackle rack, utilizing the same stretch cords as tiedown straps to secure the tackle rack to the railing or cleats of a boat.

14 Claims, 9 Drawing Figures

PATENTED JUN 17 1975 3,889,805

SHEET 1

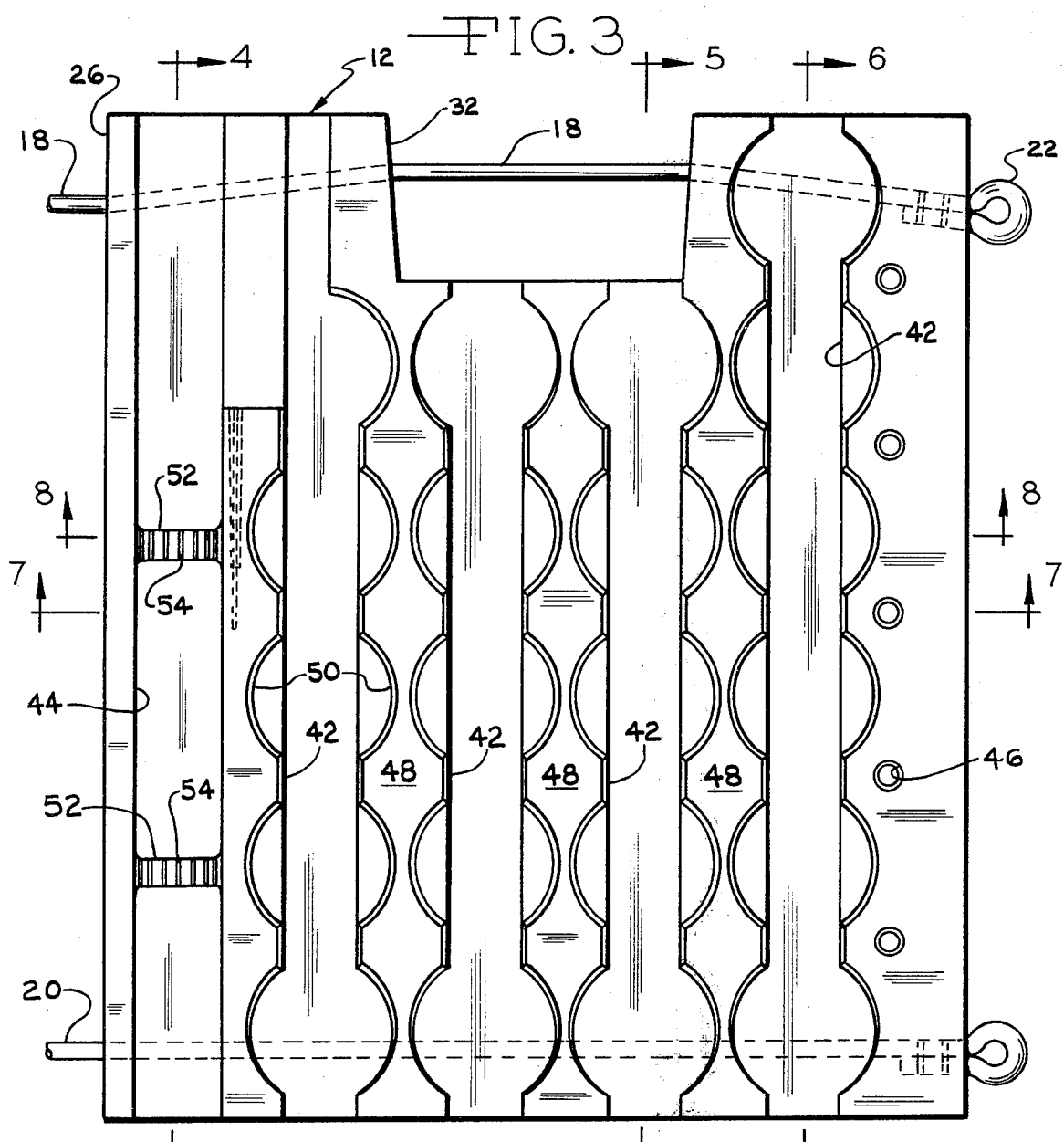
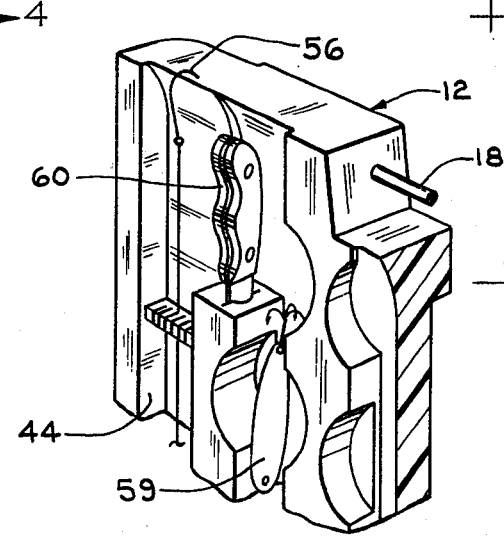

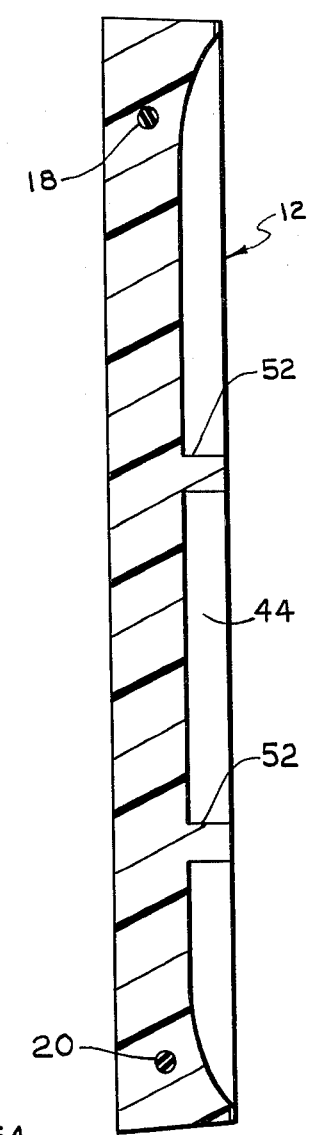
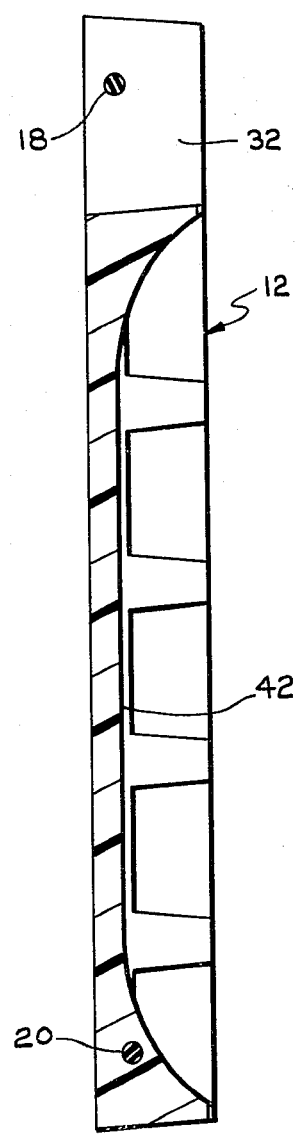
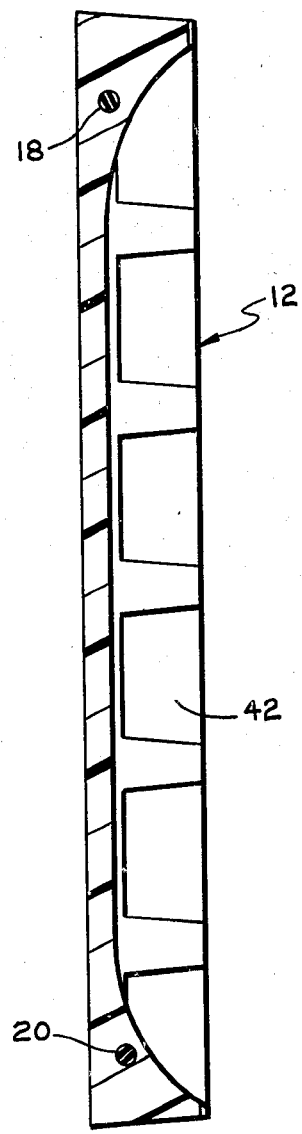
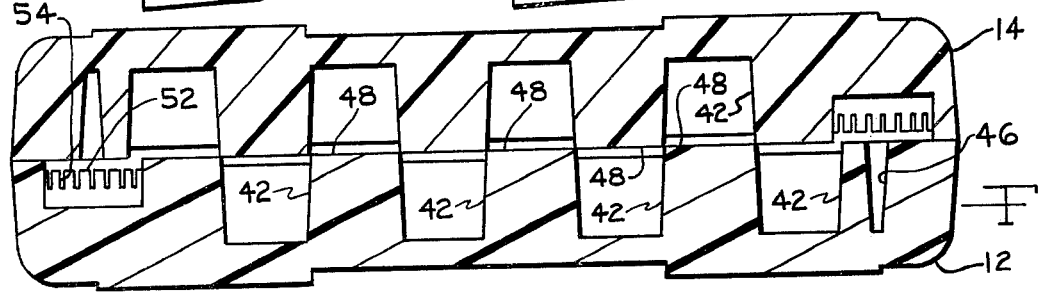
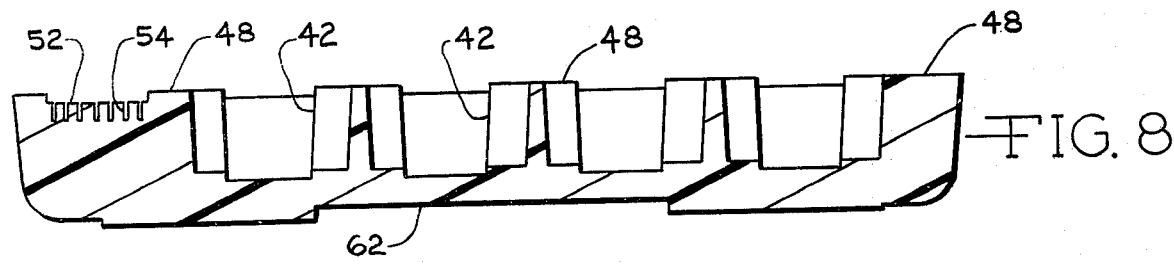

FISHING TACKLE RACK

BACKGROUND OF THE INVENTION

The present invention relates to improvements in fishing tackle containers, and is particularly directed to an operational fishing tackle rack adapted for storing and transporting fishing tackle and the like.

The conventional fishing tackle containers that have been used heretofore provide a box with trays disposed in various arrangement for storing fishing lures, leaders, fishing line and the like. These fishing tackle boxes have several faults. They are relatively bulky containers that are inconvenient to use for transportation purposes, and when spread open in fishing boats, they occupy precious boat space and frequently are in the way of the fisherman. Also, especially when used in conjunction with salt water fishing, they and the metal portions of the fishing tackle become rusty and the lures become stained unless all the wet contents of the fishing tackle boxes are rinsed with fresh water and dried after each day of fishing.

Further, the conventional fishing tackle boxes can be relatively heavy for carrying, and if they are inadvertently dropped into the water, they may quickly sink resulting in the possible loss of the fishing boxes and their contents. The prior art boxes also create problems with respect to the tackle becoming tangled, especially when the boxes are roughly handled during transportation.

SUMMARY OF THE INVENTION

The present invention provides a fishing tackle box or rack which is constructed and arranged as a functional container designed to overcome the inadequaceis of the prior art. The fishing tackle rack is light in weight and can be rinsed easily with the fishing tackle therein to remove salt water from the rack as well as from the fishing tackle. The fishing tackle rack is formed from two panel-shaped blocks of rigid foam plastic which have been shaped to provide vertical slots for separating lures suspended by their own hooks. Other fishing tackle can similarly be suspended or supported in the slotted panels. Stretch cords are provided for hingedly connecting the two panel-shaped halves together so that the halves can be closed together when desired or mounted in the boat in an open position with the two panels in generally the same plane. When so mounted the stretch cords can be used for strapping the panels flush against the railing, gunwale, transom well or any convenient locations in the boat, thereby most effectively utilizing the space of the boat. The stretch cords also provide a handle for carrying the fishing tackle rack when in either its closed or its open position. The material of the container is a tough, pliant floatation foam that is gasoline and oil repellent.

According to one form of the present invention, a fishing tackle rack is provided comprising first and second body portions each having a plurality of cavities therein for storing fishing tackle, and hinge means for provided hingedly connecting the body portions.

The hinge means comprise the first and second stretch cords located respectively adjacent to the top and bottom of the body portions and each secured at one end to the unhinged end of the first body portion and at the other end to the unhinged edge of the second body portion and each extending through the body portions and the adjacent hinged edges thereof. The stretch cords terminate in eyelets at the unhinged edges, and a pair of additional stretch cords are attached to the eyelets, and when the two body portions are moved to their open positions the additional stretch cords can be used as tiedown straps for strapping the body portions in upright positions in suitable locations in the boat. When it is desired to close the body portions the additional straps can be used for securing the two body portions together in their closed positions. The top edge of each body portion is recessed midway between its hinged and unhinged edges and the upper stretch cord passes through the space created by the recess so that a handle is provided by the cord for carrying the fishing tackle rack.

The cavities within the body sections are cut to provide suitable mounting locations for the tackle, and the two body sections have their cavities and the lands between the cavities so arranged that when the body portions are closed, the lands of the one panel will overlie the cavities of the other panel thereby maintaining all of the fishing tackle in secured positions during transportation of the fishing tackle rack.

Thus, it is an object of the present invention to provide improved fishing tackle apparatus especially designed to overcome certain inadequacies of fishing tackle boxes that comprise the prior art.

Other objects of the invention will appear in the following description and appended claims, reference being had to the accompanying drawings forming a part of this specification wherein like reference characters designate corresponding parts in the several views.

BRIEF DESCRIPTION OF THE DRAWINGS

FIG. 3 is an enlarged fragmentary front elevational view of one-half of the fishing tackle rack illustrating the cavities formed in the body section;

FIG. 4 is a section taken on the line 4—4 of FIG. 3;

FIG. 5 is a sectional view taken on the line 5—5 of FIG. 3;

FIG. 6 is a sectional view taken on the line 6—6 of FIG. 3;

FIG. 7 is a sectional view taken on the line 7—7 of FIG. 3 and showing the relationship of the two halves in their closed positions;

FIG. 8 is a sectional view taken on the line 8—8 of FIG. 3; and

FIG. 9 is a fragmentary perspective view showing certain fishing tackle mounted within the body section illustrated in FIG. 3.

DESCRIPTION OF THE PREFERRED EMBODIMENT

Figure 1:
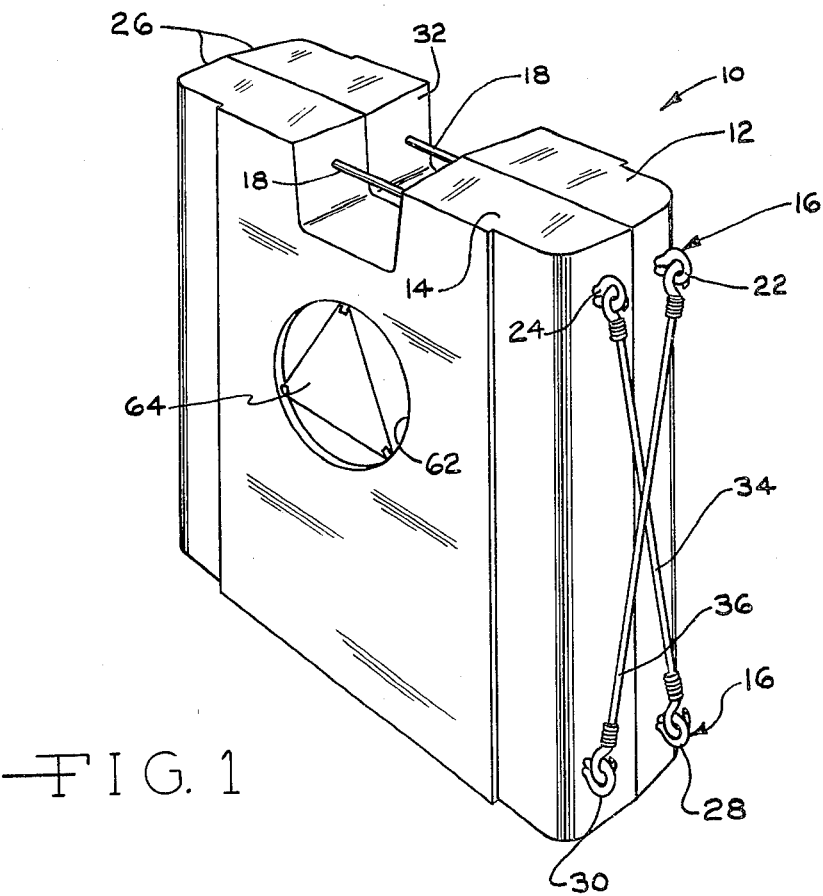
FIG. 1 is a perspective view of a fishing tackle rack in its closed position embodying one form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The fishing tackle box or rack 10 includes the first body portion 12 and the second body portion 14. These body portions preferably are formed from a material that is a tough, pliable floatation foam that is gasoline and oil repellent. One suitable material for this purpose is a material which is sold by The Dow Chemical Company under the trademark "Ethafoam", which is a tough, flexible, and resilient, closed-cell foam material. Other suitable materials of this general character may also be employed.

The fishing tackle rack 10 includes a hinge means 16 which includes a first stretch cord 18 and a second stretch cord 20 (FIG. 3). The first stretch cord 18 is secured at one end to the eyelet 22 at the unhinged edge of the first body section 12 and is secured at the other end to the eyelet 24 at the unhinged edge of the second body portion 14. The stretch cord 18 extends through both body portions 12 and 14 and out of the adjacent hinged edges 26. The second stretch cord 20 is similarly connected at its ends to the eyelet 28 in the first body portion 12 and at the other end to the eyelet 30 in the second body portion 14, and the stretch cord 20 passes through each of these body sections and extends between the hinged ends 26.

Figure 2:
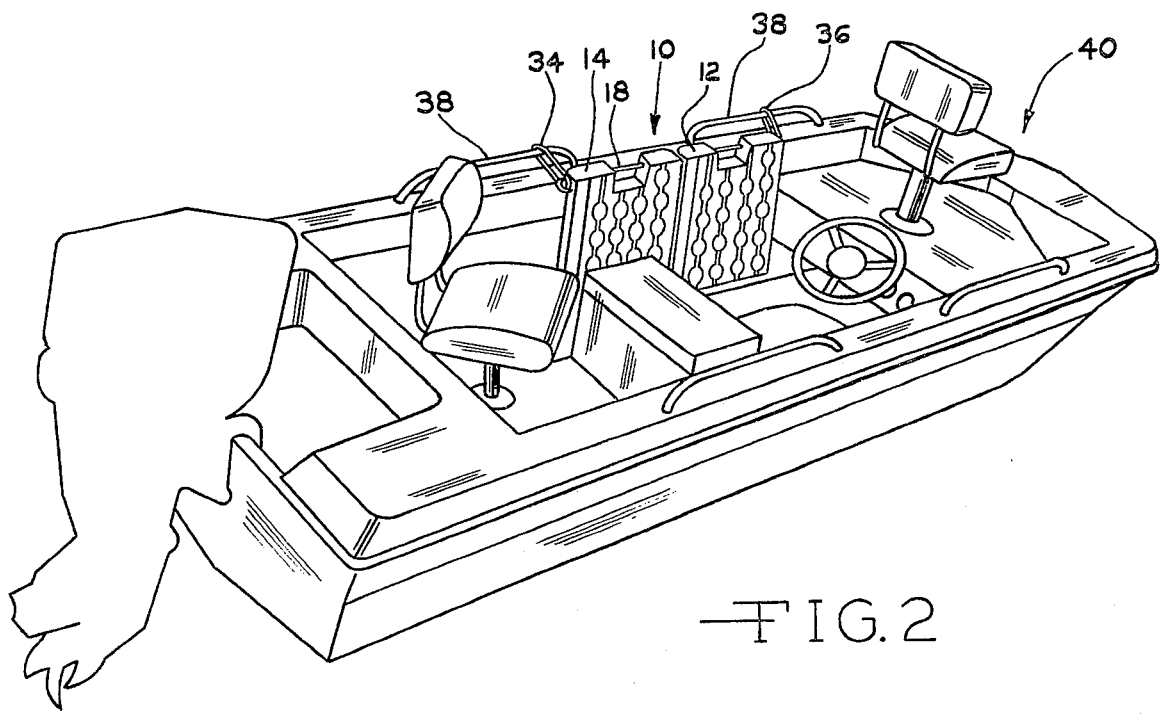
FIG. 2 is a perspective view of a fishing boat showing one arrangement of mounting the fishing tackle rack in an open position.

Each of the first and second body portions 12 and 14 are recessed at their upper edges at 32, and the first stretch cord 18 passes through the recessed portion so as to provide a handle for carrying the fishing tackle rack 10 when in its closed position of FIG. 1 or when in the open position shown in FIG. 2.

The fishing tackle rack 10 also includes a pair of additional stretch cords 34 and 36 which are releasably attached to the lower eyelets 28 and 30 so that they can be disconnected therefrom to permit the fishing tackle rack to be opened to the position shown in FIG. 2, and when it is desired to close the fishing tackle rack, the additional stretch cords 34 and 36 can be reconnected to the eyelets 28 and 30 to secure the fishing tackle rack in the closed position as shown in FIG. 1. The additional cords 34 and 36 may also be arranged so that they can be disconnected from the upper eyelets 22 and 24 if it is more convenient to secure the fishing tackle rack against a lower supporting bracket. As is shown in FIG. 2 the fishing tackle rack 10 is strapped against the side rails 38 of the fishing boat 40 where the fishing tackle rack is conveniently located for the fisherman, and all of the lures are visible and available for immediate use.

In the illustrated embodiment of the invention, the first and second body portions 12 and 14 are constructed substantially identically the same, and therefore only the first body portion 12 will be described in detail. The body portion 12 has been formed from a panel-shaped block of foam material in which a plurality of cavities, 42, 44, 46 have been shaped. The cavities 42 define vertical slots of selected configurations which are separated by lands 48, the slots including circular segments 50 on opposite sides thereof to provide surfaces into which the hooks of the fish lures can be embedded. The circular segments also provide a circular-shaped cavity in which spools of fish line, and the like, can be inserted.

The cavity 44 includes a pair of transverse partitions 52 which have a series of slits 54 therein in which fishing leaders can be inserted and retained in place by a hook 56 as is shown in connection with the leader 58 in FIG. 9. Fishing lures can be retained in place in a similar manner as shown by the lure 59. Fishing pliers, fishing knives and the like can also be inserted into holes formed in the lands 48 as is shown, for example, in FIG. 9 wherein the knife 60 is mounted. Other suitable fishing tackle, such as spare hooks and small lures can be pressed into the cavities 46. It will be appreciated by those skilled in the art, that cavities of various other configurations can also be shaped in the body portions 12 and 14 to accommodate other types of fishing tackle, if this is desired. In addition, cavities can also be provided on the exterior surface of the first and second body portions to carry other types of fishing equipment. For example, a cylindrical cavity 62 can be provided in which a triangular plate having barbed corners can be inserted within the cylindrical recess to retain a coil of wire fishing leader.

From the above description, it will be appreciated that a simple, lightweight fishing tackle rack has been provided which can readily accommodate most types of terminal fishing tackle and which overcomes the previously stated shortcomings of the prior art fishing tackle boxes. In the illustrated embodiment, the fishing lures and the like can be secured in place by suspending them vertically from their own fish hooks, as shown in FIG. 9, and the lands and cavities are so arranged that when the first and second body portions 12 and 14 are in their closed positions, such as is shown in FIG. 7, the lands of the one body portion will overlie the cavities of the other body portion so that the fish lures and other fishing tackle will be retained in place within the fishing tackle rack. After the fishing has been completed, the fishing tackle rack can be taken to a suitable location where it can be set in its open position and fresh water can be washed over the fishing tackle rack and over all the fish lures and other fishing tackle. This will assure that all of the parts are washed free of any salt and the like so that rusting and staining of the fishing tackle is minimized.

It is claimed:

1. A fishing tackle rack comprising first and second body portions each having top and bottom edges and upright hinged and unhinged edges and a plurality of cavities therein for storing fishing tackle, and hinge means hingedly connecting said body portions, said hinge means comprising first and second stretch cords located respectively adjacent to the top and bottom edges of the body portions and each secured at one end of the unhinged edge of the first body portion and at the other end to the unhinged edge of the second body portion and each extending through both body portions and the adjacent hinged edges thereof.

2. The fishing tackle rack that is defined in claim 1, wherein the top edge of each body portion is recessed midway between its unhinged and hinged edges and said first stretch cord extends through the recesses to provide a handle for carrying the fishing tackle rack.

3. The fishing tackle rack that is defined in claim 1, wherein said cavities are separated by lands that extend from the top edges to the bottom edges of the body sections, and then the body sections are in closed positions the lands of one body section are disposed over the cavities of the other body section.

4. The fishing tackle rack that is defined in claim 1, wherein said body portions have substantially the same configuration.

5. The fishing tackle rack that is defined in claim 1, wherein one of said body portions has a cylindrical recess formed in its exterior surface and a retainer plate fitted into the cylindrical recess for receiving a coil of wire fishing leader.

6. The fishing tackle rack that is defined in claim 1, wherein said first and second stretch cords terminate in eyelets at said unhinged edges and a pair of additional stretch cords are releasably attached one to the upper eyelet of the first body portion and the lower eyelet of the second body portion and the other to the upper eyelet of the second body portion and the lower eyelet of the first body portion for maintaining the body portions in closed positions, one end of each additional stretch cord being releasable to permit opening of said body portions.

7. The fishing tackle rack that is defined in claim 6, wherein each additional stretch cord is releasable from its lower associated eyelet so that the additional stretch cords can be used for securing the fishing tackle rack in an open position to a supporting structure.

8. The fishing tackle rack that is defined in claim 1, wherein said body portions are formed from a material that is buoyant in water.

9. The fishing tackle rack that is defined in claim 8, wherein the material of said body portions is a foam plastic.

10. A fishing tackle rack comprising first and second panel-shaped body portions each having a plurality of cavities therein for storing fishing tackle and a hinged edge and a generally parallel unhinged edge, and hinge means hingedly connecting adjacent hinged edges of said body portions for relative pivotal movement of the body portions between a closed position wherein the cavities are confined between the body portions and an open position wherein said body portions are generally in a common plane, said body portions being formed of a rigid foam plastic material, and said hinge means including first and second stretch cords each of which is secured at one end to the unhinged edge of the first body portion and at the other end to the unhinged edge of the second body portion and each extending through both body portions and said adjacent edges.

11. The fishing tackle rack that is defined in claim 10, wherein said cavities in each body portion are separated by lands disposed generally parallel to the hingedly connected edges of said body portions.

12. The fishing tackle rack that is defined in claim 11, wherein some of said cavities between said lands are longitudinal slots formed in said body portions with circular segments on opposite sides of said slots.

13. The fishing tackle rack that is defined in claim 11, wherein at least one of said cavities is a slot formed in one of said body portions with transverse partitions, said transverse partitions having a plurality of narrow slits parallel to said slot in which fish leaders and the like can be inserted.

14. The fishing tackle rack that is defined in claim 11, wherein said first and second body portions have substantially the same configurations, and the cavities and lands are arranged so that when the body portions are in their closed positions the lands of one body portion are disposed over the cavities of the other body portion.

\* \* \* \* \*